United States Patent [19]
Wallace

[11] 3,727,375
[45] Apr. 17, 1973

[54] CONTINUOUS ELECTROMIGRATION PROCESS FOR REMOVAL OF GASEOUS CONTAMINANTS FROM THE ATMOSPHERE AND APPARATUS

[76] Inventor: Richard A. Wallace, 43 Kingscote Gardens, Stanford, Calif. 94305

[22] Filed: Aug. 12, 1971

[21] Appl. No.: 171,121

Related U.S. Application Data

[63] Continuation-in-part of Ser. No. 23,733, March 30, 1970.

[52] U.S. Cl. ............................55/2, 55/68, 55/73, 55/101, 55/387, 204/87, 204/180 B, 204/180 P, 210/24, 210/37
[51] Int. Cl. .......................................B03c 9/02
[58] Field of Search ...............204/87, 180 P, 180 B, 204/301, 103, 86, 129, 299 R, 98, 296; 210/24, 37; 131/10, 262 A; 55/68, 73, 74, 75, 2, 159, 179, 220, 233, 387, 388, 389, 512, 234, 101

[56] References Cited

UNITED STATES PATENTS 3,274,095  9/1966  Meyers............................204/301
3,337,444  8/1967  Meyers........................204/180 P X
3,562,139  2/1971  Leitz...........................204/299 R X

FOREIGN PATENTS OR APPLICATIONS 106,727  2/1939  Australia...........................210/37

OTHER PUBLICATIONS

Frilette, Vincent J., "Preparation And Characterization of Bipolar Ion-Exchange Membranes", Journal of Physical Chemistry, Vol. 60, April 1956, pages 435–439

Primary Examiner—Dennis E. Talbert, Jr.
Attorney—Charles J. Sepciale

[57] ABSTRACT

A continuous process for removal of gaseous contaminants, particularly carbon dioxide, from an atmosphere containing the same, which comprises subjecting the gaseous contaminant laden atmosphere to contact with strongly basic ionic polymer sheet under the influence of an applied electrical field. The apparatus for accomplishing this comprises at least one and preferably a plurality of cylindrically shaped perforated reinforced sheets, in strip form, of strongly basic ionic polymeric material partially suspended at the lower end thereof into a circulating stream of sea water, the polymeric cylindrically shaped sheets being interspersed between a source of an appiable electric field, e.g., a cathode and an anode, and a cation-exchange membrane and an anion-exchange membrane being in turn interspersed between the cathode and the upper exposed ends of the polymeric sheets.

9 Claims, 3 Drawing Figures

PATENTED APR 17 1973 3,727,375

INVENTOR
RICHARD A. WALLACE
BY
Charles J. Speciale
ATTORNEY

CONTINUOUS ELECTROMIGRATION PROCESS FOR REMOVAL OF GASEOUS CONTAMINANTS FROM THE ATMOSPHERE AND APPARATUS

REFERENCE TO RELATED APPLICATIONS

This application is a continuation-in-part of my U.S. Patent application, Ser. No. 23,733, filed Mar. 30, 1970, entitled "CONTINUOUS ELECTROMIGRATION PROCESS FOR REMOVAL OF GASEOUS CONTAMINANTS FROM THE ATMOSPHERE AND APPARATUS."

BACKGROUND OF THE INVENTION

1. Field of the Invention

This invention relates to an electrolytic method for removing gaseous contaminants, particularly carbon dioxide, from an atmosphere laden with the same.

2. Description of the Prior Art

Excess carbon dioxide ($CO_2$) in the atmosphere continues to pose a major habitability problem, particularly for example, for submarine personnel. The toxicity of $CO_2$ is such that visible changes in respiration and circulation occur at concentrations above 3 percent, while depression and loss of consciousness can be expected in a 5% $CO_2$ atmosphere. The new preferred level for submarine $CO_2$ concentration is 0.5 percent for standard operation.

The $CO_2$ scrubbers presently in use employ a modified monoethanol amine (MEA) solution as the $CO_2$ absorbent. In these systems, air is drawn into and mechanically mixed with the absorbent in the stripper boiler. After cooling, the air has an exit $CO_2$ concentration of about 0.5 percent. Although scrubber systems vary, they are generally designed to achieve a high degree of contact between the air and the recirculating MEA. Desorbed gas is passed out the top of the stripper boiler where it is cooled and ejected via the $CO_2$ compressor.

Some of the problems in scrubber operation and maintenance are listed below.

a. contamination of the atmosphere by ammonia, a degra-tion product of MEA.

b. excessive make-up consumption of MEA.

c. noise, overheating and possible failure of compressors under conditions of low-level $CO_2$ concentrations.

d. frequent mechanical repairs and troublesome maintenance.

e. $CO_2$ bubbles released to the ocean surface by the compressors.

f. large volume and space requirements.

SUMMARY OF THE INVENTION

In accordance with the present invention, there has now been discovered an improved continuous electrolytic method for removal of gaseous contaminants, particularly $CO_2$, from an atmosphere containing the same which comprises subjecting the gaseous contaminant laden atmosphere to contact with a strongly basic ionic polymer sheet under the influence of an applied electrical field.

The apparatus for accomplishing this is relatively simple and comprises, at least one, and preferably a plurality of cylindrically shaped perforated reinforced sheets (in strip form) of strongly basic ionic polymeric material partially suspended at the lower end thereof into a circulating stream of sea water (or brackish water), the polymer sheets in turn being interspersed between a source of an electrical field appliable to the apparatus, e.g., a cathode and an anode, and a cation-exchange membrane and an anion-exchange membrane being in turn interspersed between the cathode and the upper exposed ends of the polymer sheets.

By this method and apparatus, the continuous removal of $CO_2$ in the form of bicarbonate anions ($HCO_3^-$) and of trace amounts (up to 150 p.p.m.) of other acidic gaseous air contaminants, such as nitrogen dioxide ($NO_2$); sulfur dioxide ($SO_2$) and hydrogen sulfide ($H_2S$), can be accomplished particularly well, for example, in submarine breathing atmospheres. By the present method impure $CO_2$ laden air, containing slight amounts of acidic gaseous air contaminants, is passed through layers of strongly basic ionic polymer sheets which hang into circulating sea water. The $CO_2$ reacts with the hydroxyl ions on the active sites of the polymer sheet forming bicarbonate ions, while the slight amounts of acidic gaseous air contaminants undergo acid-base ionic reactions. The effluent, purified air, is now recirculated back through the submarine atmosphere, while the bicarbonate ions are discharged into the sea water. As indicated, by means of an applied (direct current) voltage, the sorbed bicarbonate ions are transported towards the positively charged anode consisting of preferably a silver-silver chloride or a copper-copper chloride anode immersed in the circulating sea water. The negatively charged cathode is similarly formed of preferably silver-silver chloride or a copper-copper chloride. On being transported to the anode electrode compartment, the bicarbonate ions are discharged into the sea water effluent in the form of a liquid sodium bicarbonate. Advantageously, since there is sodium bicarbonate originally contained in sea water, the net result is a small increase in the bicarbonate content in the sea water. The strongly basic ionic polymer sheets are regenerated into the hydroxyl ion form electrolytically, as will be more fully described hereinbelow. It is to be understood that by "strongly basic" we mean those compounds that yield hydroxyl ions in aqueous solution.

BRIEF DESCRIPTION OF THE DRAWINGS

The invention will be more fully understood with reference to the accompanying drawings in which.

DESCRIPTION OF THE SPECIFIC EMBODIMENTS

Figure 1:
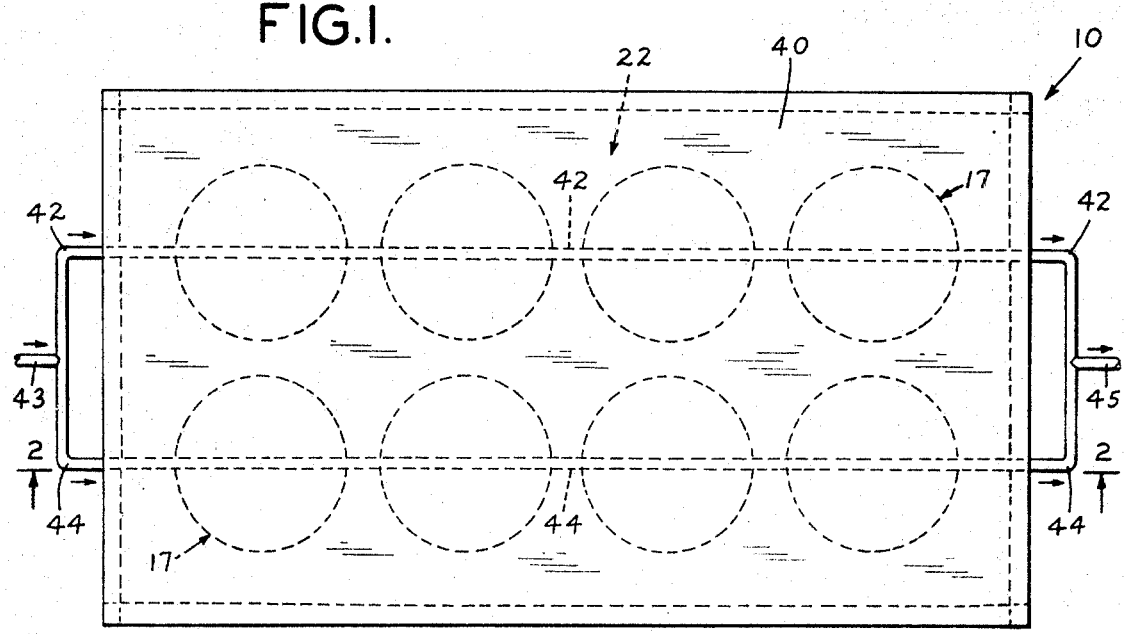
FIG. 1 is a top plan view showing the invention device as assembled.
Figure 2:
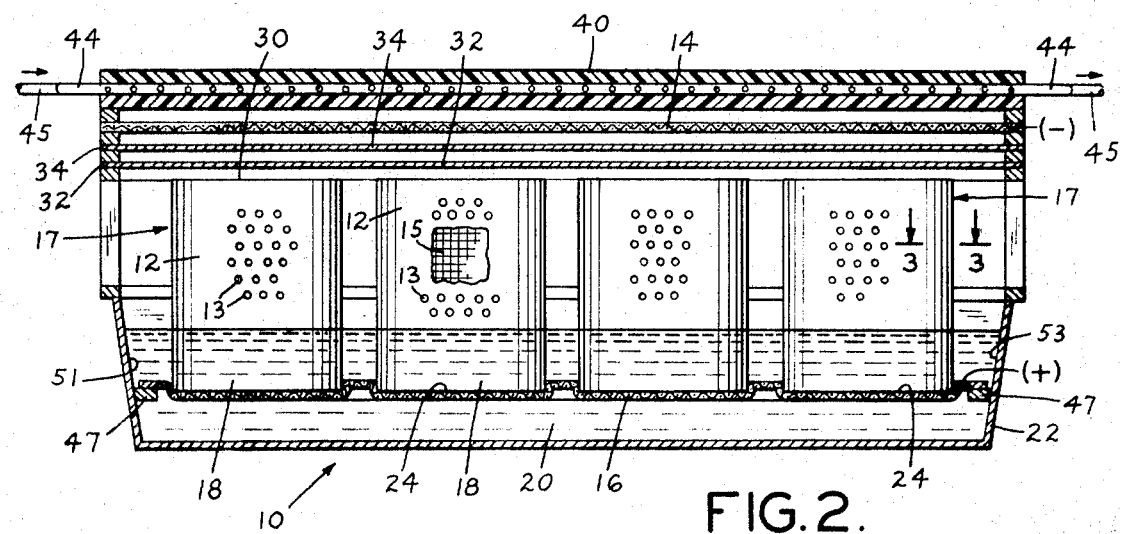
FIG. 2 is an elevated side view of the invention device situated between a source of an electrical field comprising a positive and negative electrode.
Figure 3:
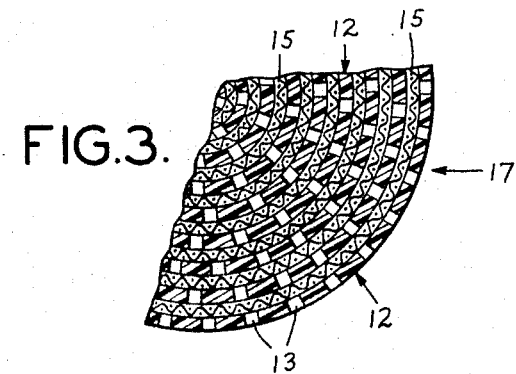
FIG. 3 is a fragmented sectional portion of one of the cyclindrically shaped reinforced sheets of polymeric material used in the present form of the invention.

Referring now to the figures of the drawings, the $CO_2$ (and other acidic gaseous contaminants) removal device 10 comprises a plurality of strongly basic ionic polymer sheets 12 interspersed between a silver-silver chloride cathode 14 and a silver-silver chloride anode 16. Each sheet 12 is perforated randomly with apertures (holes, etc.) 13 and is reinforced by a polyethylene screen backing 15 and is loosely rolled into a cylindrical unit 17. The polyethylene screen may be any commercially available screening., such as Dupont's "Vexar," of about 2–12 mesh. This combination of apertures and screening allows for the facilitation of the passage of $CO_2$-laden air therethrough. The screening as a backing for the sheet also affords a strong mechanical support for the same. Each unit 17 is immersed at its lower ends 18 into a circulating bath of sea water 20 contained in a suitable conventional trough 22 (about one inch of sea water is all that is required for immersion of the lower ends, for maximum efficiency). Conveniently, this is accomplished by providing U-shaped circular indentations 24 right in the very anode 16, itself, said indentations being of a size to accept and accommodate comfortably each cylindrical unit 17 of polymeric material. In this particular instance, for illustration, there is shown eight cylindrical units and indentations to receive the same; however, it is to be understood that this number can vary depending on the size apparatus desired; only one cylindrical unit can be used and preferably four are used. Intermediate the upper exposed ends 30 of the sheets of cylindrical units 17 and the cathode 14 is provided a sheet of anion-exchange membrane 32 and a sheet of cation-exchange membrane 34 with the anion-exchange membrane 32 being the membrane closest to the polymer sheet ends 30. Small amounts of tap water, supplied intermittently, are provided to flow around the exchange membranes 32 and 34 and the cathode 14 in order to maintain electrical conductivity, as was described in my aforesaid copending application. The tap water (of minimum salt content) is introduced by means of a commercially available plastic (or rubber) foam sheet 40 which is water saturated. The insertion of two parallel water-filled longitudinally transversing, perforated, inlet tubes 42, 44 (e.g., copper or other suitable rigid material) allows the tap water to be soaked up by the foam material. The foam sheet 40 can over-lay the whole apparatus and can be supported at the four corners thereof by conventional supports, such as posts, as can the cathode 14 and anionic membranes 32 and 34. The source of tap water is not shown but this is insertable via the pipes 42, 44 which are "siamesed" together by an inlet pipe 43 and exit pipe 45. The tap water can be introduced, if desired, periodically by a time-activated solenoid valve. For example, only 5–10 millimeters of water every three hours was introduced into the top of a cylindrical roll, during the run shown below. The anode screen 16 is restable on longitudinally opposing ledges 45, 47 in the inside vertical end walls 51, 53 of the trough 22.

Each polymer sheet (unrolled), or strip, may be about 14 feet long and about 6 inches wide. Alternatively, each polymer strip may be about 8 feet long and about 10 inches wide, and a plurality of them may be abutted or joined end to end before rolling. The diameter of the apertures 13 may range from one-eighth inch to three-fourths inch, preferably three-eighths inch or one-half inch. As indicated, the rolled sheets 17 are mechanically supported in the indentations 24 in the anode 16. At least one, and preferably a plurality (e.g., four) of these polymer rolled, reinforced sheets is allowed to dip into the circulating sea water bath 20 at the bottom of the cell. When a plurality of rolled sheets are employed, then they should be, for greater effectiveness and efficiency of contaminant removal, staggered or baffled within the apparatus, rather than in an aligned formation. The silver-silver chloride anode 16 is fully immersed in the sea water, while the silver-silver chloride cathode 14 is subject to contact with the tap water at the top of the cell. As indicated, immediately below the cathode 14 is the cation and anion-exchange membrane junction which electrodialytically produces the hydroxyl regenerant ions necessary for the polymer sheets to function continuously in the removal of $CO_2$ from the $CO_2$ laden atmosphere.

Describing now in greater detail the operation of the invention method and apparatus, when a $CO_2$ laden atmosphere is allowed to come in contact with the strongly basic ionic polymer cylindrically rolled sheets 17, these rolled sheets absorb large volumes of $CO_2$ and moisture and convert the $CO_2$ to bicarbonate ions, which ions are then eliminated as liquid bicarbonate salts in the circulating sea water by continuous electromigration under a low direct current (D.C.) voltage. By means of the applied D. C. voltage, the sorbed bicarbonate ions are transported towards the positively charged anode which is immersed in the sea water. On being transported to the anode electrode compartment, the bicarbonate ions are discharged into the sea water effluent in the form of liquid sodium bicarbonate. The sea water effluent from the anode compartment may be pumped into, for example, the submarine ballast tanks, and discharged, whenever convenient, directly into the sea. For the process to be continuous, the hydroxyl ions on the cylindrically rolled polymer sheets must of course be regenerated or replaced. This is done electrolytically and involves the electrolytic production of $OH^-$ ions and the migration of the $OH^-$ ions under the applied electrical field. This is accomplished by the dissociation of the tap water coincident with the passage of current at the interface of the anion-exchange membrane. Water molecules at the interface between the two oppositely charged ion-exchange membranes, i.e., cation and anion-exchange membranes dissociate to provide $H+$ and $OH^-$ ions under the influence of the applied voltage. There must be pure water at the interface which is in turn of high resistivity which in turn breaks the water up into $H+$ and $OH^-$ ions. In the event of an emergency or electrical failure, the roll of $CO_2$-absorbing sheets can be readily removed and immersed in a reverse supply of a chemical regenerant or a dilute alkaline solution which supplies the regenerant hydroxyl ions. Then the roll can be returned to the unit where it can resume removing $CO_2$ from the entering air stream.

The strongly basic ionic polymer sheets may be any one of those commercially available containing hydroxyl groups, some of which were described in my copending application.

In most test runs, the cathode was a silver wire mesh electrolytically coated with silver chloride. During operation, the silver chloride undergoes reduction to silver metal and chloride ions. (the discharge chloride ions remain in the vicinity of the cathode, prevented from migrating throughout the cell by the cation-exchange membrane diaphragm.) Similarly, the silver-silver chloride anode undergoes oxidation, whereby silver is oxidized to silver ion, which in turn reacts with chloride ion from the surrounding sea water that flows through the anode compartment.

This system has removed trace amounts (up to 150 ppm) of the gaseous contaminants: $NO_2$, $SO_2$ and $H_2S$ from air at various humidities at room temperature. These acidic gases readily underwent ionic reactions with the reactive hydroxyl ionic groups of the strongly basic plastic sheet.

The weak acid hydrogen sulfide also underwent an acid-base reaction with the highly basic sheet. All of these gaseous air contaminants were completely removed in a single pass in the present $CO_2^-$ removal device.

The regeneration rate of sheet polymer increased with a decrease in salt content of the water (tap water) and an increase in flow rate. All regenerations were carried out continuously at current densities up to 8 $mA/cm^2$. When the cathode electrode was used up, it was replaced with the electroformed anode. These electrodes are interchangeable.

An increase in the operative current density made the hydroxyl ion regeneration rate proceed faster, but with less efficient utilization of the current and greater power consumption.

Tap water was always circulated at a very low flow rate, between the cathode electrode and the ion-exchange membrane junction. At current densities greater than 2 $mA/cm^2$, the water at the membrane junction interface split up into $OH^-$ and $H+$ ions. Most of the voltage drop across the electrolytic cell occurred at the bipolar membrane junction. This is expected and necessary if one wants the electrolytic breakdown of water to occur (water splitting).

As described in my copending application, electrolytic regeneration of the strongly basic polymer is a particularly advantageous method because it eliminates costly and bulky storage equipment and chemicals and permits the use of off-peak demand of electricity which is plentiful aboard nuclear submarines. Moreover, because there are no tell-tale $CO_2$ bubbles released to the ocean surface as discharge from the submarine and because the present $CO_2$ removal system is essentially noiseless, requiring no moving parts, nuclear submarines can enjoy greater safety through enhanced silent operation and reduced visible discharge wastes. Indeed, the present method is capable of maintaining a $CO_2$ concentration in submarines of 0.5 percent or less. Moreover, as the invention is presented in the instant application, with the polymeric sheets in perforated rolled reinforced cylindrical form, there are introduced further a number of advantages; there is ease of assembly in that the reinforced (i.e., screen-backed) perforated polymeric sheets may be just simply rolled into cylindrical form and inserted into the anode receptacle; the upper edges of the cylindrical roll are stiff and even, making for better electrical contact; there is strong mechanical support provided to the rolls by the use of the "sandwiched" polyethylene screen; one long strip, or a plurality of perforated strips may be rolled up; and the rolls are easily removable from the apparatus.

While the invention has been described with particular reference to submarine atmospheres, it is also particularly suitable in any area where a $CO_2$-laden atmosphere is a problem, e.g., mines-shafts, ships' holds, etc.

The invention will be further illustrated in conjunction with the following specific experimental run which will serve as an example of the invention. In the example below, the ion-exchange junction was provided by a heterogeneous commercial Ionac MC–3142 cation-exchange membrane and an Ionac MA–3148 anion-exchange membrane. It is to be understood that the size of the sheets employed will be determined by the amount of space available in the area to be scrubbed of gas contaminants and how much air is to be purified.

EXAMPLE

A perforated strong-base plastic sheet consisting of homogeneous quaternary ammonium divinylbenzene-polystyrene hydroxide having a 3.5 milliequivalent per gram capacity and a water content of 45 percent was employed.

Eight sheets were used; in this instance 8 feet long and 10 inches wide, joined end to end, and rolled longitudinally to form one roll. The perforations were 3/8 inch diameter holes and the screen backing was polyethylene screed (Dupont's "Vexar") 8–12 mesh.
Operating Conditions and Results:
 Applied Voltage: 130 Volts
 Operating Current Density: 2.5 milliamps/$cm^2$
 Entering Air: 1.3% $CO_2$-Air, 45% R. H. (relative humidity), 25° C., flow rate 250 $ft.^3$/minute
 Exit Air: 0.3% $CO_2$-Air, 50% R. H.
 Intermittent Regeneration every 6 hours
 Average $CO_2$-Removal per gram of perforated plastic sheet = 70 milligrams It is to be noted that exit air contained only 0.3% $CO_2$ while entering air was laden with 1.3% $CO_2$.

What is claimed is:

1. A continuous electromigratory process for removal of gaseous contaminants from an atmosphere containing the same which comprises continuously subjecting the gaseous contaminant laden atmosphere to contact with a strongly basic ionic polymeric material in the presence of water under the influence of an applied electrical field whence the basic properties of said polymeric material become depleted, and continuously regenerating the basic properties of said polymeric material wherein said strongly basic ionic polymeric material is in reinforced cylindrical form, said cylindrical form being prepared from a rolled perforated sheet of said polymeric material.

2. A method according to claim 1 wherein at least one rolled perforated sheet, in elongated strip form, of said polymeric material is employed.

3. A method according to claim 1 wherein said cylindrical form is reinforced by backing and perforated elongated sheet with a screening material.

4. A method according to claim 1 wherein the gaseous contaminant comprises predominantly carbon dioxide.

5. An apparatus for continuously removing gaseous contaminants from an atmosphere containing the same which comprises at least one reinforced cylindrical unit, said cylindrical unit being formed from a rolled perforated sheet of strongly basic ionic polymeric material, said cylindrical unit being partially suspended at its lower end thereof into a circulating stream of sea water or brackish water, said cylindrical unit being interspersed between a source of an electrical field applicable to said apparatus consisting of a cathode and an anode, a cation-exchange membrane and an anion-exchange membrane, forming an ion-exchange membrane junction, being in turn interspersed between said cathode and the upper exposed ends of said polymeric sheet, a source of tap water being circulable about said cathode and the ion-exchange membrane junction.

6. An apparatus according to claim 5 wherein a plurality of said cylindrical units are provided, and wherein said cylindrical unit is reinforced by backing said perforated elongated sheet with a screen material.

7. An apparatus according to claim 5 wherein said cylindrical unit is formed of an elongated strip of said polymeric material.

8. An apparatus according to claim 5 wherein said cylindrical unit is formed of a plurality of polymeric sheets.

9. An apparatus according to claim 5 used for removing carbon dioxide from a carbon dioxide laden atmosphere.

* * * * *